United States Patent
Zegman et al.

(10) Patent No.: US 9,647,985 B2
(45) Date of Patent: May 9, 2017

(54) LOCATION-AWARE RATE-LIMITING METHOD FOR MITIGATION OF DENIAL-OF-SERVICE ATTACKS

(71) Applicant: Check Point Software Technologies Ltd., Tel-Aviv (IL)

(72) Inventors: Tamir Zegman, Tel-Aviv (IL); Ofer Barkai, Givatayim (IL)

(73) Assignee: CHECK POINT SOFTWARE TECHNOLOGIES LTD, Tel-Aviv (IL)

( * ) Notice: Subject to any disclaimer, the term of this patent is extended or adjusted under 35 U.S.C. 154(b) by 0 days.

(21) Appl. No.: 13/900,576

(22) Filed: May 23, 2013

(65) Prior Publication Data

US 2014/0351878 A1 Nov. 27, 2014

(51) Int. Cl.
  *H04L 29/06* (2006.01)
  *H04L 12/26* (2006.01)

(52) U.S. Cl.
  CPC ...... *H04L 63/0227* (2013.01); *H04L 63/1458* (2013.01); *H04L 43/106* (2013.01)

(58) Field of Classification Search
  CPC .............. H04L 63/0227; H04L 63/1458; H04L 63/0254; H04L 63/1425; H04L 63/023; H04L 43/106
  USPC .......................................................... 726/1
  See application file for complete search history.

(56) References Cited

U.S. PATENT DOCUMENTS

| | | | | |
|---|---|---|---|---|
| 7,215,637 | B1* | 5/2007 | Ferguson et al. | 370/230.1 |
| 7,633,944 | B1* | 12/2009 | Chang et al. | 370/392 |
| 7,921,462 | B2* | 4/2011 | Rooney | H04L 63/1425 713/151 |
| 2002/0133586 | A1* | 9/2002 | Shanklin et al. | 709/224 |
| 2003/0145232 | A1* | 7/2003 | Poletto | H04L 63/1408 726/22 |
| 2004/0250114 | A1* | 12/2004 | Parekh | H04L 43/106 726/23 |
| 2004/0250127 | A1* | 12/2004 | Scoredos et al. | 713/201 |
| 2005/0249214 | A1* | 11/2005 | Peng | H04L 63/1458 709/224 |
| 2007/0011745 | A1* | 1/2007 | Mitomo et al. | 726/24 |
| 2007/0083924 | A1* | 4/2007 | Lu | H04L 63/0227 726/13 |
| 2010/0138539 | A1* | 6/2010 | Neville | H04L 45/00 709/226 |
| 2013/0007257 | A1* | 1/2013 | Ramaraj | H04L 63/0263 709/224 |
| 2013/0114619 | A1* | 5/2013 | Wakumoto | H04L 45/24 370/406 |
| 2014/0006629 | A1* | 1/2014 | Lau et al. | 709/227 |

* cited by examiner

*Primary Examiner* — Hadi Armouche
*Assistant Examiner* — Bryan Wright
(74) *Attorney, Agent, or Firm* — Mark M. Friedman (57) ABSTRACT

A network component has a set of one or more rules, each of which has a match component and an action component. If an incoming packet maps to the match component of a rule, then the packet is handled according to the rule's action component. If the rule also includes a limit component, then if the packet maps to the rule's match component, a family history of the rule is updated, and the packet is handled according to the rule's action component only if the rule's family history satisfies the rule's limit component.

14 Claims, 5 Drawing Sheets

| Octet |     | 0 |   |   |   |   |   |   |   | 1 |   |    |    |    |    |    |    | 2  |    |    |    |    |    |    |    | 3  |    |    |    |    |    |    |
|-------|-----|---|---|---|---|---|---|---|---|---|---|----|----|----|----|----|----|----|----|----|----|----|----|----|----|----|----|----|----|----|----|----|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0     | 0   | *Version* | | | | *IHL* | | | | *DSCP* | | | | | | *ECN* | | *Total Length* | | | | | | | | | | | | | | | |
| 4     | 32  | *Identification* | | | | | | | | | | | | | | | | *Flags* | | | *Fragment Offset* | | | | | | | | | | | | |
| 8     | 64  | *Time To Live* | | | | | | | | *Protocol* | | | | | | | | *Header Checksum* | | | | | | | | | | | | | | | |
| 12    | 96  | *Source IP Address* | | | | | | | | | | | | | | | | | | | | | | | | | | | | | | | |
| 16    | 128 | *Destination IP Address* | | | | | | | | | | | | | | | | | | | | | | | | | | | | | | | |
| 20    | 160 | *Options* | | | | | | | | | | | | | | | | | | | | | | | | | | | | | | | |

LOCATION-AWARE RATE-LIMITING METHOD FOR MITIGATION OF DENIAL-OF-SERVICE ATTACKS

FIELD AND BACKGROUND OF THE INVENTION

The present invention relates to computer network security and, more particularly, to a method of mitigating Denial-of-Service (DoS) and Distributed Denial-of-Service (DDoS) attacks.

In network computing, a Denial-of-Service (DoS) attack is an attack whose purpose is to disrupt the normal operation of a computer system or of a computer network. In many cases, such attacks are carried out by overwhelming the computer system or the computer network with a large number of packets, connections or requests. Some of these attacks are carried out from multiple sources, and so are called Distributed Denial-of-Service (DDoS) attacks.

For such attacks to succeed it suffices to overload just one of the network components that lead to the server whose service is to be disrupted. Such a network component could be a router, a switch, a load balancer or a security gateway.

Furthermore, some of the traffic generated by the sources of the attacks might be allowed under conventional security policies and so be forwarded to the targeted servers. Such traffic could then overload the network or the servers, thereby disrupting normal service.

Co-pending U.S. patent application Ser. No. 13/682,754 teaches a "penalty box" mechanism, for a security gateway, that makes efficient use of the resources of the security gateway. This mechanism does not address the impact of DoS and DDoS on network components, such as routers and switches, that are traversed by network packets on their way to the security gateway.

It would be highly advantageous to have a method of mitigating DoS and DDoS attacks that would overcome the disadvantages of presently known systems as described above.

SUMMARY OF THE INVENTION

According to the present invention there is provided a method of filtering packets at a network component, including the steps of: (a) providing at least one rule, each rule including a match component and an action component; and (b) for each packet and for each rule: if the each packet maps to the match component of the each rule: handling the each packet according to the action component of the each rule; wherein, if the each rule also includes a limit component, the method also includes the step of (c) if the each packet maps to the match component of the each rule: updating a family history of the each rule; and the each packet is handled according to the action component of the each rule only if the family history of the each rule satisfies the limit component of the each rule.

According to the present invention there is provided a network component including: (a) at least one input port for receiving packets; and (b) a filtering module for filtering the packets by steps including: for each packet and for each of at least one rule: if the each packet maps to a match component of the each rule: handling the each packet according to an action component of the each rule; wherein, if the each rule also includes a limit component, the filtering also includes: if the each packet maps to the match component of the each rule, updating a family history of the each rule, the each packet being handled according to the action component of the each rule only if the family history of the each rule satisfies the limit component of the each rule.

According to the present invention there is provided a network component including: (a) a non-volatile memory for storing: (i) at least one rule for filtering packets, and (ii) program code for filtering the packets by steps including: for each packet and each rule: if the each packet maps to a match component of the each rule: handling the each packet according to an action component of the each rule, wherein, if the each rule also includes a limit component, the filtering also includes, if the each packet maps to the match component of the each rule, updating a family history of the each rule, the each packet being handled according to the action component of the each rule only if the family history of the each rule satisfies the limit component of the each rule; and (b) a processor for executing the program code.

The basic method of the present invention is a method by which a network component filters incoming packets. The network component applies one or more rules to each packet. For each rule, if the packet maps to a match component of the rule, then the packet is handled according to an action component of the rule. Optionally, a rule may also include a limit component. If a rule includes a limit component, then if an incoming packet matches the rule's match component, a family history of the rule is updated, and the packet is handled according to the rule's action component only if the updated family history satisfies the rule's limit component.

Optionally, for each packet and for each rule that also includes a limit component, if the packet maps to the rule's match component and if the rule's family history satisfies the rule's limit component, the packet also is logged.

One preferred type of match component is a property of the packet. Exemplary packet properties that are suitable for use as match components include the source address of the packet, a CIDR block that includes the source address of the packet, a source address range that includes the source address of the packet, the protocol of the packet, the destination port of the packet, the destination address of the packet, a CIDR block of the destination address of the packet, and a VPN tunnel identifier of the packet.

Another preferred type of match component is a property of the sender of the packet. The sender of the packet is inferred from the source address of the packet. Exemplary sender properties that are suitable for use as match components include the geographic location (geographical region, e.g., country) of the sender, the Autonomous System Number of the sender, the name of the sender and a reputation score of the sender.

Another preferred type of match component is a property of an ingress interface, of the network component, at which the packet is received. Exemplary ingress interface properties include the identity of the ingress interface and the identity of an ingress interface group of which the ingress interface is a member.

Exemplary preferred limit components include an absolute packet rate, an absolute byte rate, an absolute rate of opening new connections, an absolute number of concurrently open connections, a relative packet rate, a relative byte rate, a relative rate of opening new connections and a relative (to the total current traffic as a reference) number of concurrently open connections. Preferably, the limit component includes a track qualification, such as the packet source address, the network service protocol of the packet, and the packet's destination address, that defines the granularity (e.g. by individual packet vs. collectively for all packets) of the family history.

Exemplary preferred action components include "bypass", "drop" and "notify".

A basic hardware, firmware software-based network component of the present invention includes one or more input ports for receiving packets and a filtering module. The filtering module filters the packets by the basic method of the present invention.

Another basic software-based network component of the present invention includes a non-volatile memory for storing one or more rules and program code for implementing the basic method of the present invention relative to the rules, and a processor for executing the program code.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a defense against DoS and DDoS attacks according to the present invention may be better understood with reference to the drawings and the accompanying description.

DoS and DDoS attack traffic typically differs from normal traffic in at least one of the following attributes:
Packet rate
Byte rate
Network service protocol or protocols (including port number(s), if applicable
Rate of opening new connections
Number of concurrently open connections
Geographic distribution of the origin of the traffic
Organizational affiliation of the origin of the traffic
Reputation of the origin of the traffic The present invention provides a rules-based policy, for a network component, for mitigating attacks that differ from normal network traffic with regard to such attributes. The method can be used to limit traffic that comes from specific sources or that is directed towards specific destinations (services or servers).

The rule base includes a set of rules. Each rule includes a match component, an optional limit component and an action. For each rule that includes a limit component, a family history is maintained for packets that map to the rule's match component. If, when a packet that maps to the rule's match component is received, the family history is in violation of the rule's limit component, then the rule's action is applied to the packet.

The match component is a selection criterion to which each incoming packet is mapped. A successful mapping means that the packet matches the criterion, so that, if the rule includes a limit component, the rule's family history is updated accordingly.

There are three preferred kinds of match components: match components that are properties of packets (typically, properties of packet headers), match components that are properties of the senders of packets, and match components that are properties of ingress interfaces of the network components that receive the packets.

Figure 1:
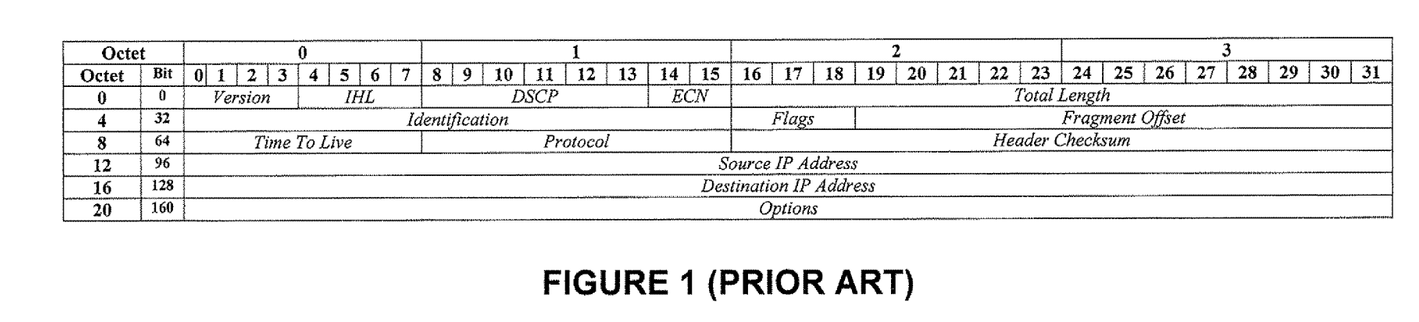
FIG. 1 shows the format of an IPv4 packet header.

Exemplary properties of packets include:
Source address
Classless Inter-Domain Routing (CIDR) block of which the source address is a member
Membership of source address in a range of source addresses
Protocol
Destination port
Destination address
CIDR block of which the destination address is a member
VPN tunnel identifier Referring now to the drawings, FIG. 1 shows the format of an IPv4 packet header. The header fields that are relevant to these exemplary properties are the Protocol, Source IP Address and Destination IP Address fields.

For IPv4 packets, matches to the exemplary match components are defined as follows:

A source address match means that the address in the Source IP Address field is equal to a "source address" match component.

A source address CIDR block match means that the address in the Source IP Address field is in the CIDR block indicated by a "source address CIDR block" match component.

A source address range match means that the number in the Source IP Address field is in the range defined by a "source address range" match component.

A protocol match means that the number in the Protocol field is the IP protocol number of a "protocol" match component.

A "destination port" match component includes a protocol number and either a port number or a range of port numbers. The protocol number typically is either 6 (TCP) or 17 (UDP) but could be the protocol number of any protocol that uses the notion of ports. A destination port match means that the number in the Protocol field equals the protocol number and the corresponding port number in the packet data is the port number of the "destination port" match component or is included in the range of port numbers of the "destination port" match component. If the first item in the packet data is either a TCP header or a UDP header, then the port number is the seventeenth through thirty-second bits of the data.

A destination address match means that the number in the Destination IP Address field is equal to a "destination address" match component.

A destination address CIDR block match means that the number in the Destination IP Address field is in the CIDR block indicated by a "destination address CIDR block" match component.

VPN tunnel identifier may be used as a match component by a network component that is the terminus of one or more VPN tunnels. The VPN tunnel identifier could identify a single VPN tunnel, or could identify a group of VPN tunnels, such as "all VPN tunnels that terminate at sender X", or such as "all VPN tunnels that terminate at senders X, Y and Z". The VPN tunnel associated with a packet can be identified from the packet payload. For example, if the VPN tunnel is based on IPSec packets with ESP (Encapsulating Security Packet) payloads, the SPI (Security Packet Index) of each ESP header includes information that the network component can use to identify the sender and the VPN tunnel.

Exemplary properties of packet senders include:
Geographic location of sender (e.g., country of sender)
Autonomous System Number (ASN) of sender
Organization name of sender
Reputation of sender The geographic location of the sender, the ASN of the sender and the name of the sender are inferred from the source address (e.g. IPv4 Source IP Address field) of the packet. There are on-line services that provide such information. The location, ASN or name of the sender can be queried per packet from an on-line service. Alternatively, the network component subscribes to an on-line service that provides and periodically updates a database that matches IP addresses to locations, ASNs and/or organizations, and the network component queries the database as needed. Similarly, there are on-line services, such as the community-based collaborative firewall log correlation system "DShield", that provide lists of known malicious IP addresses and numerical rankings of their relative maliciousness. The corresponding match component is either a minimum maliciousness ranking or a maximum maliciousness ranking, depending on how the selected on-line service ranks maliciousness.

Exemplary properties of ingress interfaces include individual physical ingress interfaces (ports), individual virtual ingress interfaces (e.g. individual VLAN tags or individual Generic Routing Encapsulation (GRE) tunnels), and groups of physical or virtual ingress interfaces at which the packets arrive. Examples of groups of ingress interfaces, in the case of the network component having an asymmetric relationship to a local network (for example if the network component is a security gateway of a local network or if the network component is a router between the Internet and a corporate network), include "all external ports" (ports at which arrive packets from outside the network that is protected by the security gateway) and "all internal ports" (ports at which arrive packets from inside the network that is protected by the security gateway). In the case of a local network that has a "demilitarized zone" (DMZ) for services that are provided to an external network, examples of groups of ports of a security gateway of the local network, between the local network and the DMZ, include "all DMZ ports" (ports at which arrive packets from the DMZ) and "all internal ports"; and examples of groups of ports of a security gateway of the DMZ, between the DMZ and the external network, include "all external ports" and "all DMZ ports".

The limit component consists of a set of one or more limits and, optionally, one or more track qualifications.

There are eight preferred limits:
Absolute packet rate
Absolute byte rate
Absolute rate of opening new connections
Absolute number of concurrently open connections
Relative packet rate
Relative byte rate
Relative rate of opening new connections
Relative number of concurrently open connections The four relative limit components are relative to current traffic as a reference.

If the limit component includes more than one limit, the limits are combined by the Boolean operators "AND", "OR" and "NOT" in the usual way.

The optional track qualification specifies that the packets, bytes and/or connections should be counted individually per the track qualification, rather than cumulatively for all the traffic that matches the rule's match component. There are three preferred track qualifications: source address, network service protocol and destination address.

There are three preferred action components:
Bypass
Drop
Notify

"Bypass" means send the packet along towards its destination. "Drop" means drop the packet. "Notify" means notify the network administrator that according to the family history of traffic that matches the rule's match component, that traffic exceeds (one of) the limit(s) of the limit component. Normally, a rule whose action component is "Bypass" does not include a limit component, so that a family history is not maintained for such a rule, and every packet that maps to the rule's match component is sent along to its destination. Note that matching a rule whose action component is "Bypass" or "Drop" automatically terminates the application of the rules to the packet in question.

Of course, packets that match none of the rules in the rule base are sent along to their destinations.

Optionally, when, upon the arrival of a packet that matches a rule's match component, according to the family history of traffic that matches the rule's match component, that traffic exceeds (one of) the limit(s) of the rule's match component, that event is logged.

The following are examples of rules.

Rule Example 1

Match component: IPv4 source address=5.0.100.120
Limit component: 1000 packets per second, no track qualification
Action component: drop
When a packet whose source address is 5.0.100.120 arrives, a time stamp of the packet is added to the family history. Time stamps earlier than one second before the current time are deleted from the family history. If the number of time stamps in the family history exceeds 1000, the packet is dropped.

Rule Example 2

Match component: IPv4 source address range=192.168.100.0 to 192.168.103.255
Limit component: 10,000 bytes per second OR 10% of total bytes, no track qualification
Action component: notify
When a packet whose source address is between 192.168.100.0 and 192.168.103.255 arrives, the number of bytes in the packet is recorded in the family history with a time stamp and is added to the cumulative number of bytes in the family history. The bytes of byte records with time stamps earlier than the current time are subtracted from the cumulative number of bytes, and those byte records are deleted from the family history. A similar global history is maintained for all received packets. If the cumulative number of bytes of the family history exceeds 10,000 or the cumulative number of bytes exceeds 10% of the cumulative number of bytes of the global history, the network administrator is notified.

Rule Example 3

Same as rule example 2 except that the match component is expressed as the equivalent CIDR block, 192.168.100.0/22.

Rule Example 4

Match component: IPv4 source addresses 5.0.100.10, 5.0.100.20, 5.0.100.30
Limit component: 20 concurrently open connections, track qualification destination address Action component: drop When a packet whose source address is either 5.0.100.10 or 5.0.100.20 or 5.0.100.30 arrives, if the packet is the first packet of a connection to any destination address, then: if that destination address does not have any open connections from that source address, then an entry for that source address and that destination address is opened in the family history. The entry includes a counter that is initially set to 1, and is incremented by 1 whenever a packet arrives that opens another connection from that source address to that destination address, and is decremented by 1 whenever a packet arrives that closes a connection from that source address to that destination address. If a packet arrives, from one of the three source addresses for any destination address, whose corresponding counter is 20, the packet is dropped. Whenever a counter is decremented to 0, the entry that includes that counter is deleted from the family history.

Rule Example 5

Match component: Ethernet VLAN interfaces eth0.0 through eth0.4 (Ethernet port, VLAN tags 0 through 4)

Limit component: 500 new connections opened per second, no track qualification

Action component: drop

When a packet with VLAN tag 0, 1, 2, 3 or 4 arrives at Ethernet port eth0, if the packet is the first packet of a connection then a time stamp is added to the family history and all time stamps older than one second are deleted. If the number of time stamps in the family history exceeds 500 then the packet is dropped.

Rule Example 6

Match component: protocol: IP protocol number=1
No Limit component
Action component: bypass The purpose of this rule is to avoid applying any other rules to ICMP (Internet Control Message Protocol) packets. All ICMP packets are automatically forwarded.

Rule Example 7

Match Component: destination port: IP protocol number=6 and destination port≠80

Limit component: 1000 packets per second, no track qualification

Action component: drop

When a packet whose IP protocol number is 6 (TCP) and whose destination port number is not the normal HTTP port number (80) arrives, a time stamp of the packet is added to the family history. Time stamps earlier than one second before the common time are deleted from the family history. If the number of time stamps in the family history exceeds 1000, the packet is dropped. This rule blocks a DoS or a DDoS attack that sends TCP traffic to random ports.

Figure 4A:
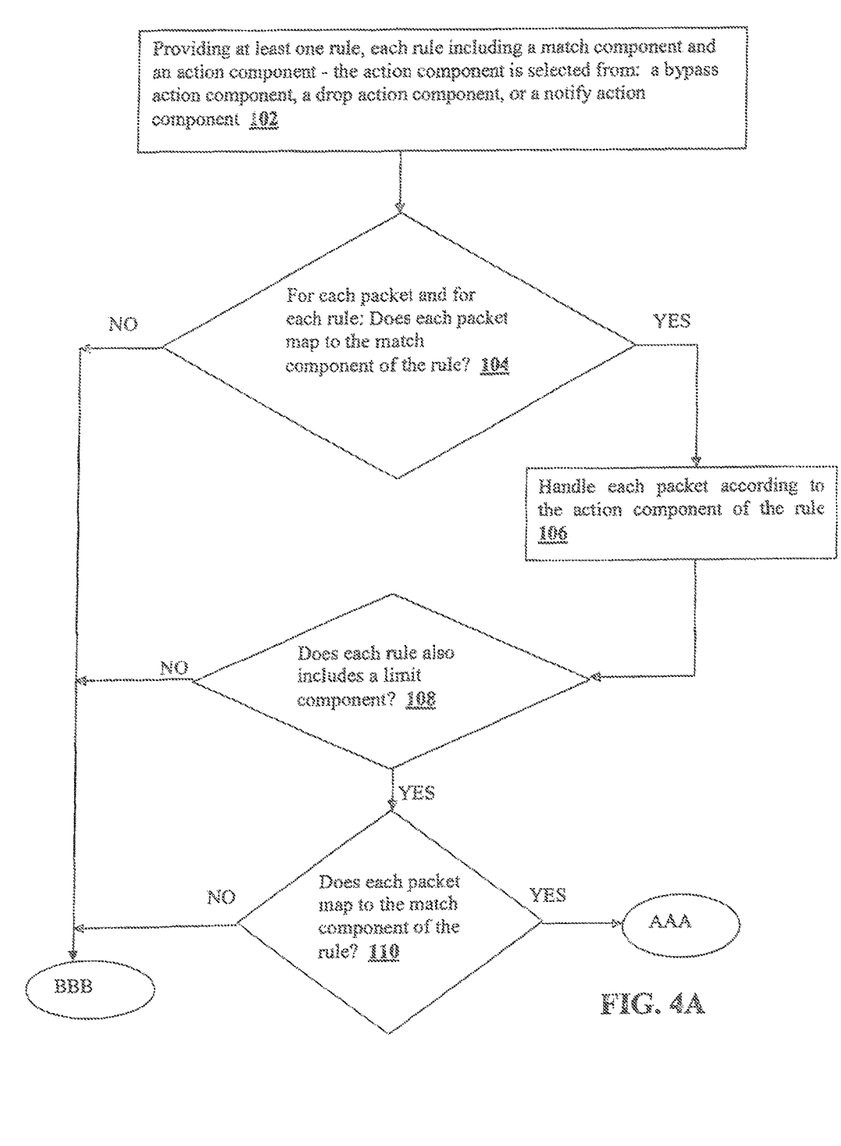
FIGS. 4A and 4B are a flow diagram of a process in accordance with embodiments of the present invention.
Figure 4B:
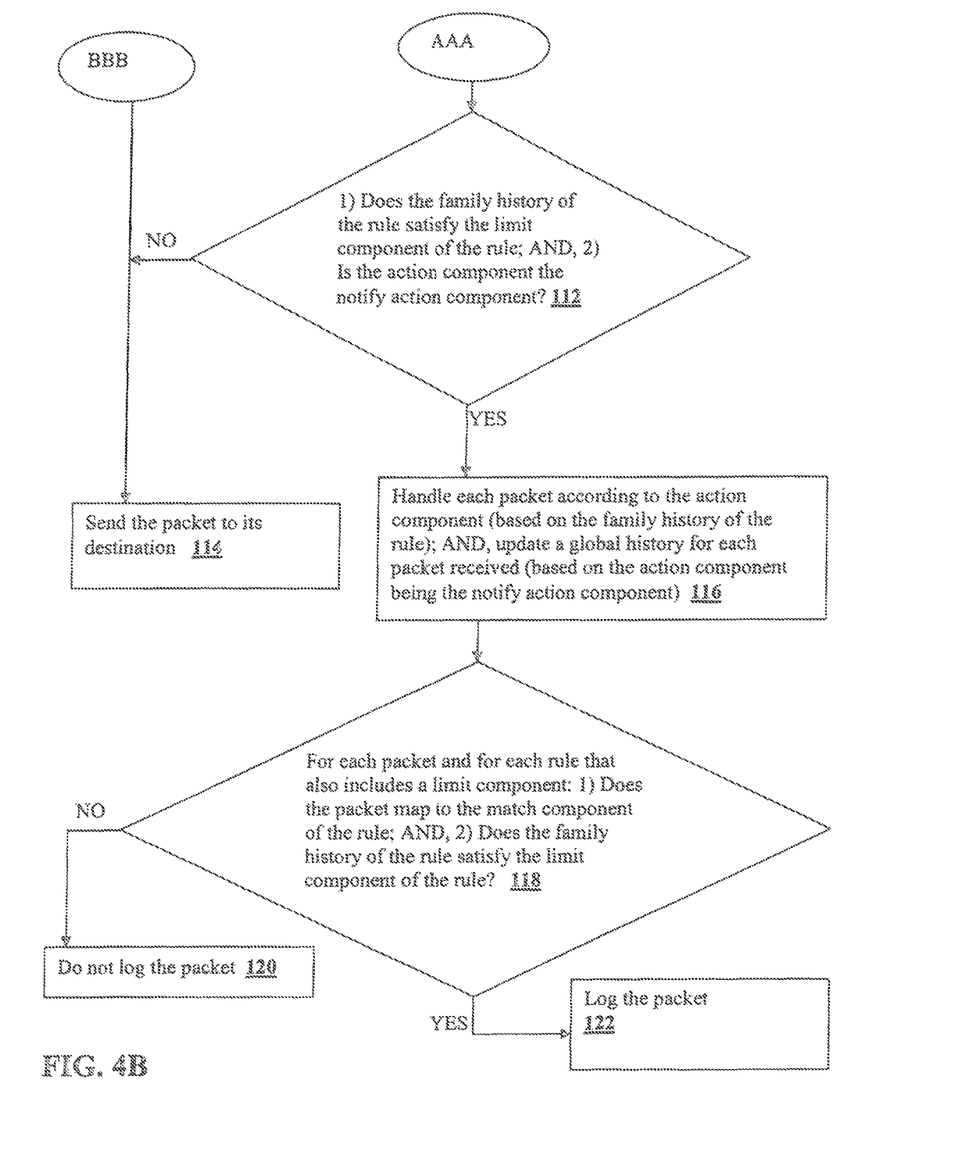

An example method in accordance with the method of the invention detailed above is shown in the flow diagram of FIGS. 4A and 4B.

Figure 2:
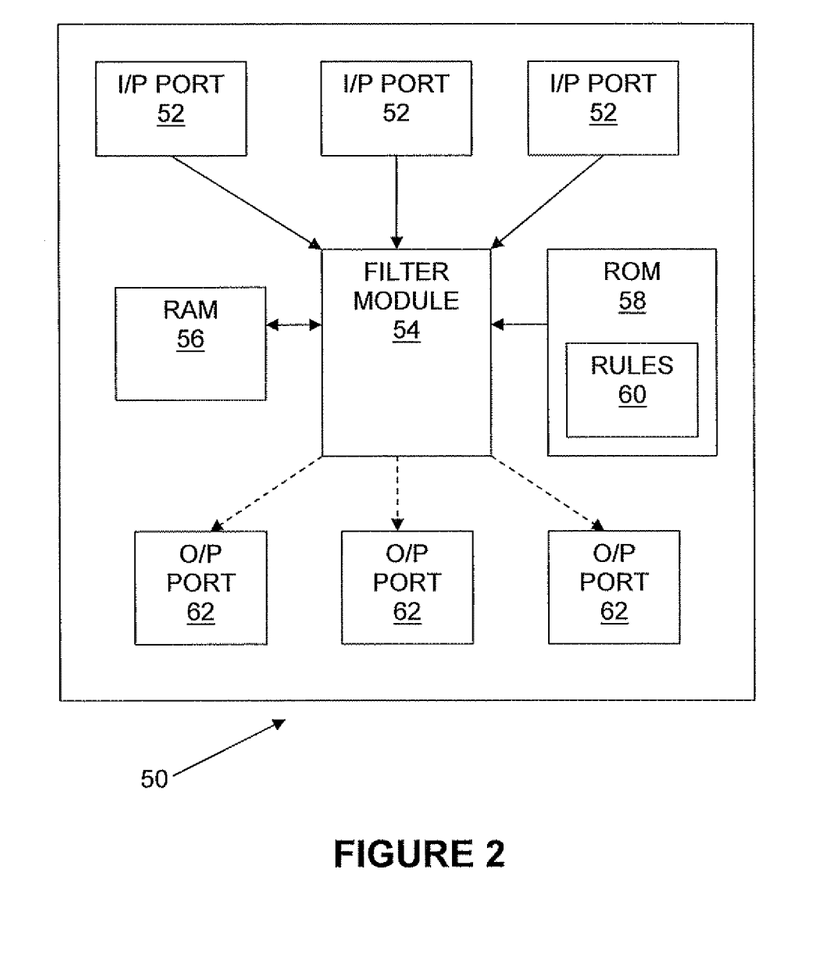
FIGS. 2 and 3 are high-level block diagrams of network components of the present invention.

FIG. 2 is a high-level block diagram of a network component 50 of the present invention. Network component 50 includes a filter module 54 that receives packets from input ports 52 and filters the packets, as described above, with reference to a set of rules 60 that is stored in a read-only memory 58. In support of the filtering, filter module 54 maintains family histories of the packets in a random access memory 56. Packets that are allowed to be forwarded are forwarded via output ports 62. The arrows from filter module 54 to output ports 62 are dashed to show that not all packets received at input ports 52 are forwarded via output ports 62. Filter module 54 may be implemented in hardware, firmware, software or any combination thereof. In other embodiments, rules 60 are stored in a read/write non-volatile memory such as a flash disk, rather than in a read-only memory.

Figure 3:
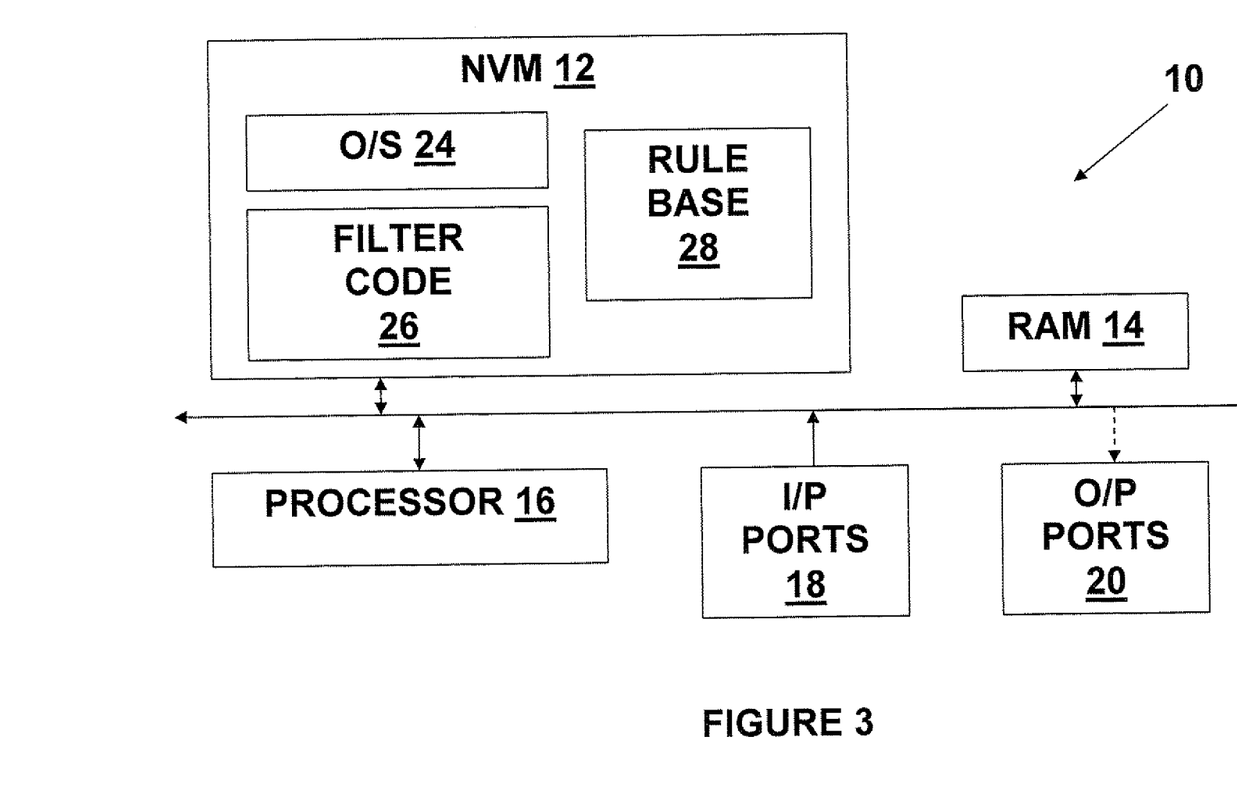

FIG. 3 is a high-level partial block diagram of a software-based network component 10 of the present invention. For clarity of illustration, only the components of network component 10 that are relevant to the present invention are shown in FIG. 3. Network component 10 includes a non-volatile memory (NVM) 12, a random access memory (RAM) 14, a processor 16, a set 18 of input ports and a set 20 of output ports, all communicating with each other via a bus 22. An operating system (O/S) 24 of the device is stored in non-volatile memory 12, as is filter code 26 and a rule base 28 for implementing the method of the present invention as described above. Under the control of O/S 24, processor 16 loads filter code 26 into RAM 14 and executes filter code 26 from RAM 14. Packets that arrive at input ports 18 are filtered according to the rules in rule base 28. Family histories of the packets are maintained in RAM 14. Packets that rules 28 allow to be forwarded are forwarded via output ports 20. As in FIG. 2, the arrow from bus 22 to output ports 20 is dashed to show that not all packets received at input ports 18 are forwarded via output ports 20.

Non-volatile memory 12 is an example of a computer-readable storage medium bearing computer-readable code for implementing the packet filtering methodology described herein. Other examples of such computer-readable storage media include read-only memories such as CDs bearing such code.

Attention is now directed to FIGS. 4A and 4B which show a flow diagram of an exemplary process in accordance with embodiments of the invnetion. Initially, at block 102, there is provided at least one rule, each rule including a match component and an action component. The the action component is selected from: a bypass action component, a drop action component, or a notify action component.

From block 102, the process moves to block 104, where, for each packet and for each rule, it is determined whether each packet maps to the match component of the rule. If no, the process moves to block 114, where the packet is sent to its destination. If yes, the process moves to block 106, where each packet is handled according to the action component of the rule.

From block 106, the process moves to block 108, where it is determined whether each rule also includes a limit component. If no, the the process moves to block 114, where the packet is sent to its destination. If yes, the process moves to block 110.

At block 110, it is determined whether each packet maps to the match component of the rule. If no, the the process moves to block 114, where the packet is sent to its destination. If yes, the process moves to block 112.

At block 112, it is determined whether: 1) the family history of the rule satisfies the limit component of the rule; AND (AND being a logical AND), 2) the action component is the notify action component. If no (to one or both conditions), the the process moves to block 114, where the packet is sent to its destination. If yes (to both conditions), the process moves to block 116.

At block 116, each packet is handled according to the action component (based on the family history of the rule); and, a global history is updated for each packet received (based on the action component being the notify action component). The process moves to block 118, where, for each packet and for each rule that also includes a limit component, whether: 1) the packet maps to the match component of the rule; AND (AND being a logical AND), 2) the family history of the rule satisfies the limit component of the rule. If no (to one or both conditions), the process moves to block 120, where the packet is not logged. If yes (to both conditions), the packet is logged, at block 122.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of filtering packets at a network component, in response to a presumed attack, comprising the steps of:
    providing at least one rule, each said rule including a match component and an action component, wherein said action component is selected from a group consisting of a bypass action component, a drop action component or a notify action component; and,
    for each packet and for each said rule: if said each packet maps to said match component of said each rule: handling said each packet according to said action component of said each rule;
wherein, if said each rule also includes a limit component, the method also includes the step of:
    if said each packet maps to said match component of said each rule: updating a family history of said each rule, for each time said each packet maps to said match component of said rule; and,
said each packet is handled according to said action component of said each rule only if said family history of said each rule satisfies said limit component of said each rule, wherein if said action component is said notify action component, update a global history for each packet received; and,
    said limit component is selected from the group consisting of: an absolute packet rate; an absolute byte rate; an absolute rate of opening new connections; a relative packet rate; a relative byte rate; a relative rate of opening new connections; and, a relative number of concurrently open connections.

2. The method of claim 1, further comprising the step of:
    for each packet and for each said rule that also includes a limit component: if said each packet maps to said match component of said each rule and if said family history of said each rule satisfies said limit component of said each rule: logging said each packet.

3. The method of claim 1, wherein said match component includes at least one property of said each packet.

4. The method of claim 3, wherein said at least one property is selected from the group consisting of:
    (a) a source address of said each packet;
    (b) a CIDR block that includes said source address of said each packet;
    (c) a source address range that includes said source address of said each packet;
    (d) a protocol of said each packet;
    (e) a destination port of said each packet
    (f) a destination address of said each packet;
    (g) a CIDR block of a destination address of said each packet; and
    (h) a VPN tunnel identifier of said each packet.

5. The method of claim 1, wherein said match component includes at least one property of a sender of said each packet.

6. The method of claim 5, wherein said at least one property is selected from the group consisting of:
    (a) a geographic location of said sender;
    (b) an Autonomous System Number of said sender;
    (c) a name of said sender; and
    (d) a reputation score of said sender.

7. The method of claim 1, wherein said match component includes at least one property of an ingress interface, of the network component, at which said each packet is received.

8. The method of claim 7, wherein said at least one property is selected from the group consisting of an identity of said ingress interface and an identity of an ingress interface group of which said ingress interface is a member.

9. The method of claim 1, wherein said limit component includes a track qualification that is selected from the group consisting of source address, network service protocol and destination address.

10. A network system for filtering packets comprising:
    a computerized processor for executing computer components in response to a presumed attack; and,
    computer components comprising modules including:
        a filtering module for filtering packets with reference to rules, by steps including: for each said packet and for each of at least one rule: if said each packet maps to a match component of said each rule: handling said each packet according to an action component of said each rule, wherein said action component is selected from a group consisting of a bypass action component, a drop action component or a notify action component;
        wherein, if said each rule also includes a limit component, said filtering also includes: if said each packet maps to said match component of said each rule, updating a family history of said each rule, for each time said each packet maps to said match component of said rule, said each packet being handled according to said action component of said each rule only if said family history of said each rule satisfies said limit component of said each rule, wherein if said action component is said notify action component, update a global history for each packet received; and,
        said limit component is selected from the group consisting of: an absolute packet rate; an absolute byte rate; an absolute rate of opening new connections; a relative packet rate; a relative byte rate; a relative rate of opening new connections; and, a relative number of concurrently open connections.

11. A network component comprising:
    (a) a non-volatile memory for storing:
        (i) at least one rule for filtering packets, and,
        (ii) program code for filtering said packets by steps including: for each said packet and each said rule if said each packet maps to a match component of said each rule: handling said each packet according to an action component of said each rule, wherein said action component is selected from a group consisting of a bypass action component, a drop action component or a notify action component;
        wherein, if said each rule also includes a limit component, said filtering also includes, if said each packet maps to said match component of said each rule, updating a family history of said each rule, for each time said each packet maps to said match component of said rule, said each packet being handled according to said action component of said each rule only if said family history of said each rule satisfies said limit component of said each rule, wherein if said action component is said notify action component, update a global history for each packet received; and, said limit component is selected from the group consisting of: an absolute packet rate; an absolute byte rate; an absolute rate of opening new connections; a relative packet rate; a relative byte rate; a relative rate of opening new connections; and, a relative number of concurrently open connections; and, (b) a processor for executing said program code in response to a presumed attack.

12. The method of claim 1, wherein said presumed attack includes a denial of service (DoS) attack.

13. The network system of claim 10, wherein said presumed attack includes a denial of service (DoS) attack.

14. The network component of claim 11, wherein said presumed attack includes a denial of service (DoS) attack.

* * * * *